United States Patent [19]

Soga

[11] 4,157,064
[45] Jun. 5, 1979

[54] MATERIAL PORTIONING APPARATUS AND METHOD

[75] Inventor: George Soga, Laval, Canada

[73] Assignee: Soga Packaging Machinery Co. Ltd., Montreal, Canada

[21] Appl. No.: 825,982

[22] Filed: Aug. 19, 1977

[30] Foreign Application Priority Data

Aug. 19, 1976 [GB] United Kingdom .............. 34639/76

[51] Int. Cl.² .......................................... B30B 13/00
[52] U.S. Cl. .................................... 100/39; 100/90;
100/95; 100/98 R; 100/215; 100/295; 53/529;
177/1; 177/82; 222/55; 425/308
[58] Field of Search ................ 177/82, 1, 67, 60, 116;
222/55; 141/81, 249; 425/308, 408, 296, 297,
310; 53/23, 24, 124 D; 100/DIG. 10, 232, 39,
90, 95, 98, 215, 295

[56] References Cited

U.S. PATENT DOCUMENTS

| | | | |
|---|---|---|---|
| 2,154,446 | 4/1939 | Haupt | 425/297 |
| 3,040,654 | 6/1962 | Opie | 53/124 D X |

*Primary Examiner*—Joseph W. Hartary
*Attorney, Agent, or Firm*—Charles E. Brown

[57] ABSTRACT

The invention relates to a material portioning apparatus and a method which provides portions of material of predetermined weight by measuring and portioning an appropriate volume of the material. Although the apparatus is especially useful when the material consists of whole pieces larger than the portioned sizes, such as fillets of fish or meat, it can also be used for portioning granular materials, or materials of sizes smaller than the portioned sizes. It is only necessary that the material, or bulks of the material, be of such a nature that, when it is compressed in one direction, it will expand or be forced to move in a different direction. In accordance with the invention, the apparatus comprises a preforming stage having an adjustable volume, and a weighing stage also having an adjustable volume. Material is fed, through the preforming stage, into the weighing stage and the weighing stage is overfilled to include a volume greater than the desired weight. The volume of the weighing stage is then adjusted to the desired volume, and any excess material will be forced back into the preforming stage. A separating means is then inserted between the weighing stage and the preforming stage to separate the materials in the two stages, and the amount remaining in the weighing stage is the amount, required by weight, of material.

7 Claims, 3 Drawing Figures

U.S. Patent  Jun. 5, 1979  4,157,064
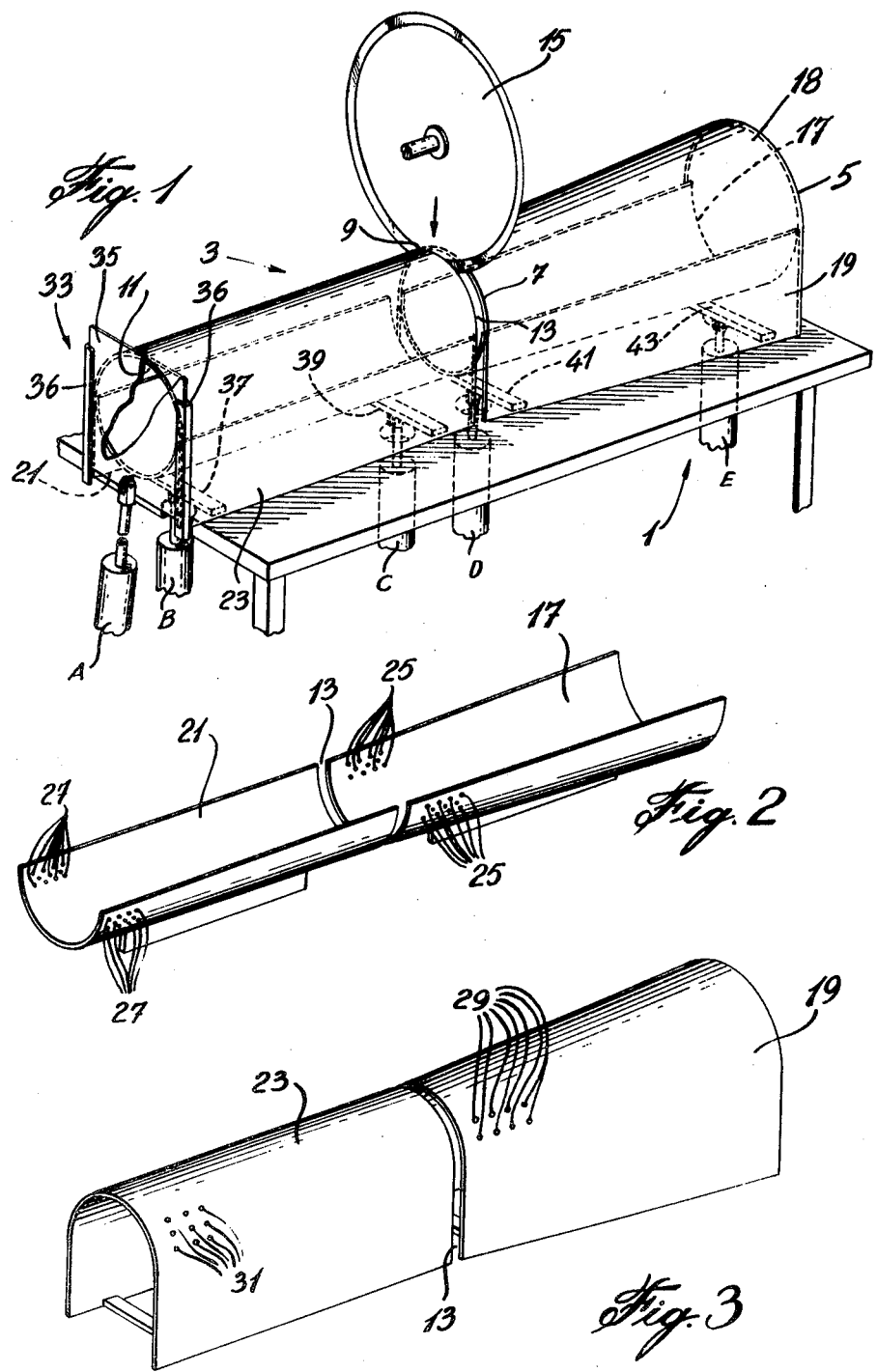

MATERIAL PORTIONING APPARATUS AND METHOD

BACKGROUND OF THE INVENTION

1. Field of the Invention

This invention relates to a material portioning apparatus and method which provides portions of material of predetermined weight by measuring and portioning an appropriate volume of the material.

The apparatus is especially useful when the material consists of whole pieces larger than the portioned sizes, such as fillets of fish or meat, but it can also be used for portioning granular materials, or materials of sizes smaller than the portioned sizes. It is only necessary that the material, or bulks of the material, be of such a nature that, when it is compressed in one direction, it will expand or be forced to move in a different direction.

2. Statement of the Prior Art

The prior art teaches implements for portioning materials and for weighing materials. Such apparatus are disclosed in, for example, U.S. Pat. No. 1,315,675, Leary, issued Sept. 9, 1919, U.S. Pat. No. 2,764,316, Sylvest, issued Sept. 25, 1956, U.S. Pat. No. 2,889,077, Cunningham, issued June 2, 1959, U.S. Pat. No. 3,221,827, Spurlin et al., issued Dec. 7, 1965, U.S. Pat. No. 3,443,651, White, issued May 13, 1969, and, U.S. Pat No. 3,820,394, Martin, issued June 28, 1974. However, none of these patents teaches an apparatus which can automatically portion and weigh materials.

The apparatus described below provides fish portions of predetermined weight. At present, in order to prepare fillets of fish for packaging in sizes of predetermined weights, the fillets, which are normally of a weight greater than the required weight, are cut to approximate size and then manually weighed. Any excess weight is snipped off by scissors, and small pieces are added when a piece is deficient in weight.

The disadvantages of this present method are that too many packages end up with too many pieces (it would be preferred to have only one piece in each package) and that a large number of human operators must be used in the process. Human operators are, of course, expensive, and are also subject to human error, especially in a routine job such as weighing materials.

As will be appreciated, although the invention is described with relation to the weighing and portioning of fish, it is equally applicable to other materials such as meat or granular materials providing the materials have the characteristics above described.

SUMMARY OF THE INVENTION

It is therefore an object of the invention to provide a material portioning apparatus and method which overcomes the above disadvantages.

It is a more specific object of the invention to provide such an apparatus which is automatic.

It is a further object of the invention to provide an automatic method for portioning materials by weight.

In accordance with the invention, a material portioning apparatus comprises a preforming stage having an adjustable volume, and a weighing stage also having an adjustable volume.

The preforming stage preferably comprises a generally funnel shaped member having an input end and an output end and being flared in the direction of the input end thereof, the volume of the funnel being adjustable.

The weighing stage preferably comprises a cylindrical shaped member having an input end and an output end, the volume of the cylinder being adjustable.

The output end of the preforming stage is disposed adjacent the input end of the weighing stage and separated therefrom by a gap, and the apparatus further comprises separating means, adapted to move into the gap to separate material in the weighing stage from material in the preforming stage.

Stop means are preferably disposed adjacent the output end of the weighing stage to prevent material from moving out of the weighing stage when the stop means is closed, and to permit exit of the material from the weighing stage when the stop means is opened.

The funnel shaped member preferably comprises a longitudinally extending top part and a longitudinally extending bottom part, the top part overlapping the bottom part, the volume of the funnel being adjustable by moving the top and bottom parts towards and away from each other in predetermined sequence.

The cylindrical shaped member preferably comprises a longitudinally extending top part and a longitudinally extending bottom part, the top part overlapping the bottom part, the volume of the cylinder being adjustable by moving the top and bottom parts towards and away from each other in predetermined sequence.

In accordance with the invention, a method of portioning material automatically by volume to provide a desired weight of said material and using the above apparatus comprises:

feeding the material to the input end of the preforming stage, through the preforming stage and into the weighing stage, while the stop means is closed, until the weighing stage is overfilled;

decreasing the volume of the cylinder of the weighing stage to a predetermined volume by moving the top and bottom parts thereof together, the output ends of the top and bottom parts being moved together to predetermined relative positions first, and the input ends thereof then being moved into predetermined relative positions, whereby any excess material will be forced back up into the preforming stage;

decreasing the volume of the funnel to a predetermined volume by moving the top and bottom parts thereof together, the output ends of the top and bottom parts being moved together to predetermined relative positions first, and the input ends thereof then being moved into predetermined relative positions, whereby to preform the next batch of material to be fed to the weighing stage;

inserting the separating means into the gap between the output end of the preforming stage and the input end of the weighing stage to separate the material of the weighing stage from the material of the preforming stage; and opening said stop means;

whereby to release from said weighing stage a portion of material of predetermined weight.

BRIEF DESCRIPTION OF THE DRAWINGS

The invention will be better understood by an examination of the following description, together with the accompanying drawings, in which:

FIG. 1 is a three dimensional view of a preferred embodiment of the invention;

FIG. 2 is a three dimensional view of the bottom parts of both the cylinder and the funnel and;

FIG. 3 is a three dimensional view of the top parts of both the cylinder and the funnel.

DETAILED DESCRIPTION OF THE DRAWINGS

Referring now to the drawings, the apparatus comprises a preforming stage, indicated generally at 1, and a weighing stage, indicated generally at 3. The preforming stage comprises a funnel shaped member which is flared at its feed or input end 5 and which decreases in diameter to the output end 7.

The weighing stage comprises a cylindrical member having an input end 9 and an output end 11. The output end 7 of the preforming stage is disposed adjacent the input end 9 of the weighing stage and is separated therefrom by gap 13. A separator means 15, which could be, for example, a circular saw, is adapted to be moved into and out of the gap 13.

The funnel comprises a longitudinally extending bottom part 17, having an input end 18, and a longitudinally extending top part 19. As can be seen in FIG. 1, the top part overlaps the bottom part. The volume of the funnel is adjustable by moving the top and bottom parts towards and away from each other.

The cylinder comprises a longitudinally extending bottom part 21 and a longitudinally extending top part 23. Again, the top part overlaps the bottom part, and again, the volume of the cylinder is adjustable by moving the top and bottom parts away from and towards each other.

As can be seen in FIGS. 2 and 3, air holes 25, 27, 29 and 31 are drilled in parts 17, 21, 19 and 23 respectively. The holes are provided to free air trapped in the apparatus when the material is being squeezed in the cylinder or funnel.

A stop means 33 is disposed to abut against the output end of the weighing stage. The stop means 33 includes a door 35 which can be closed, to prevent material from moving out of the weighing stage, and opened to permit exit of material from the weighing stage. In one embodiment, the door is disposed in guides 36 and slidable up and down in the guides. Piston and cylinder arrangement A (in FIG. 1) is a schematic representation of means for opening and closing the door 35 of stop means 33. In the illustrated embodiment, the door would be lowered to permit exit of the material from the apparatus, and lifted to close the exit.

As above mentioned, the volumes of the funnel and cylinder are adjustable by moving the bottom and top parts thereof towards and away from each other. Means for effecting this movement are shown schematically in FIG. 1 as piston and cylinder arrangements B, C, D and E, whose rods are attached to bars 37, 39, 41 and 43 rspectively. The bars are fastened respectively to the output end and input end of the top part of the cylinder and the output end and input end of the top part of the funnel. Accordingly, the top ends of the funnel and cylinder will move with the rods of their respective piston and cylinder arrangements.

It will be appreciated that the piston and cylinder arrangement is only one arrangement for providing the movement, and various other arrangements for effecting the movement could be used without departing from the spirit of the invention. It is only necessary that movement be provided separately at the individual ends of the funnel and cylinder.

The principle of operation of the invention is that, given the density of a material, a predetermined weight of the material can be obtained by obtaining an appropriate volume of the material. Thus, the arrangement for moving the parts is so designed that, in the closed position (top and bottom towards each other), the top and bottom parts of the cylinder will enclose a volume appropriate to the weight of material required for material of a given density. In the open position (top and bottom away from each other), the volume enclosed by the top and bottom parts will be greater than the appropriate volume.

The arrangement for moving the parts is also designed to operate in sequence. The first operation is to bring together the top and bottom parts at the output end of the cylinder, and the second operation is to bring together the top and bottom parts at the input end thereof. The next step is to bring together the output end of the top and bottom parts of the funnel, and the fourth step is to bring together the top and bottom parts at the input end thereof. This is the sequence of steps which is followed after the weighing stage has been filled and the portioning process is to follow as will be described below.

With this sequence, any excess material at the output end of the cylinder will be forced towards the input end thereof when the output end is closed. (This is the only direction in which the material is free to move as the stop means is closed at this time.) When the input end of the cylinder closes, any excess material in the cylinder will be forced back into the funnel. As the cylinder is initially overfilled, the entire cylinder will be filled with material when it is closed in this sequence.

In operation, the apparatus works as follows:

At the beginning of a cycle, the door 35 is closed, and the cylinder and funnel are in their open positions. Separating means 15 is out of the gap 13 so that material can move through the funnel, out of the funnel output and into the cylinder.

Material to be portioned is fed into the input end 5 of the funnel, through the funnel, into the weighing stage. As the stop means 33 is closed, the material cannot leave through the output end 11 of the weighing stage.

For the purpose of feeding the material through the funnel and into the cylinder, the apparatus can be disposed so that its longitudinal axis is substantially in a vertical attitude, so that the feed will be a gravity feed. Alternatively, if it is preferable to have the apparatus disposed in a horizontal attitude, the material can be fed to the funnel by a conveyor and then pushed through the funnel and into the weighing stage. The horizontally disposed apparatus would be mounted on a surface such as the top of table 2 in FIG. 1.

After the cylinder has been overfilled, (so that it will be compressed when the top and bottom parts thereof are moved towards each other), the piston and cylinder arrangements are activated in the sequence B, C, D and E so that any excess material in the weighing stage will be squeezed back into the preforming stage. Thus, only the desired volume of material will remain in the weighing stage.

After D and E are activated, the material in the preforming stage will be preformed so as to be more easily received in the weighing stage on the next cycle.

The separating means 15 is then moved into the gap 13 to separate the material in the weighing stage from the material in the preforming stage, after which, with 15 still in gap 13, door 35 of stop means 33 is opened and cylinder and piston arrangements B and C are activated to move the top and bottom parts of the cylinder into the open position, so that the portioned material is removed from the weighing station, either by gravity or mechanically as is appropriate. Door 35 is then closed.

Means 15 is then removed from gap 13, and cylinder and piston arrangements D and E are activated to move the top and bottom parts of the funnel into their open position. The material from the preforming stage is then moved from the preforming stage into the welding stage either by gravity or mechanically, and a new cycle is begun.

Means, well known in the art, are provided to insure the automatic operation of the apparatus in its correct sequence, so that portions of predetermined weight are provided in a completely automatic fashion.

While a preferred embodiment has been described, this was for the purpose of illustrating, but not limiting, the invention. Various modifications, which will come readily to the mind of one skilled in the art are within the scope and spirit of the invention.

I claim:

1. Apparatus for portioning material of a given density automatically by volume, comprising:
    a preforming stage having an adjustable volume; and
    a weighing stage also having an adjustable volume to a final, predetermined volume;
    said preforming stage comprising a generally funnel shaped member having an input end and an output end, the volume of the funnel being adjustable;
    said weighing stage comprising a cylindrical shaped member having an input end and an output end, the volume of the cylinder being adjustable;
    the output end of the preforming stage being disposed adjacent the input end of the weighing stage and separated therefrom by a gap.

2. An apparatus as defined in claim 1 wherein said funnel shaped member is flared in the direction of the input end thereof.

3. An apparatus as defined in claim 2 and further comprising separating means;
    said separating means being adapted to be moved into the gap to separate material in the weighing stage from material in the preforming stage.

4. An apparatus as defined in claim 3 and further comprising stop means disposed adjacent the output end of the weighing stage to prevent material from moving out of the weighing stage when the stop means is closed, and to permit exit of the material from the weighing stage when the stop means is opened.

5. An apparatus as defined in claim 1 wherein said funnel shaped member comprises a longitudinally extending top part and a longitudinally extending bottom part, the top part overlapping the bottom part, the volume of the funnel being adjustable by moving the top and bottom parts towards and away from each other in predetermined sequence.

6. An apparatus as defined in claim 1 wherein said cylindrical shaped member comprises a longitudinally extending top part and a longitudinally extending bottom part, the top part overlapping the bottom part, the volume of the cylinder being adjustable by moving the top and bottom parts towards and away from each other in predetermined sequence.

7. A method of portioning a given density material automatically by volume to provide a desired weight of said material by means of apparatus comprising:
    a preforming stage being generally funnel shaped and having a longitudinally extending top part and a longitudinally extending bottom part, the top part overlapping the bottom part, the volume of the funnel being adjustable by moving the top and bottom parts towards and away from each other in a predetermined sequence;
    a weighing stage being generally cylindrical in shape, the cylindrical shaped member comprising a longitudinally extending top part and a longitudinally extending bottom part, the top part overlapping the bottom part, the volume of the cylinder being adjustable by moving the top and bottom parts towards and away from each other in a predetermined sequence;
    the output end of the preforming stage being disposed adjacent the input end of the weighing stage and separated therefrom by a gap;
    separating means adapted to move into the gap to separate material in the weighing stage from material in the preforming stage; and
    stop means disposed adjacent the output end of the weighing stage to prevent material from moving out of the weighing stage when the stop means is closed and to permit exit of the material from the weighing stage when the stop means is opened;
    said method comprising:
    feeding the material to the input of the preforming stage, through the preforming stage and into the weighing stage, while the stop means is closed, until the weighing stage is overfilled;
    decreasing the volume of the cylinder of the weighing stage to a predetermined volume by moving the top and bottom parts thereof together, the output ends of the top and bottom parts being moved together to predetermined relative positions first, and the input ends thereof being moved into predetermined relative positions, whereby any excess material will be forced back into the preforming stage;
    decreasing the volume of the funnel to a predetermined volume by moving the top and bottom parts thereof together, the output ends of the top and bottom parts being moved together to predetermined relative positions first, and the input ends thereof being moved into predetermined relative positions, whereby to preform the next batch of material to be fed to the weighing stage;
    inserting the separating means into the gap between the output end of the preforming stage and the input end of the weighing stage to separate the material of the weighing stage from the material of the preforming stage; and
    opening said stop means;
    whereby to release from said weighing stage a portion of material of predetermined weight.

* * * * *